United States Patent Office 3,649,621
Patented Mar. 14, 1972

3,649,621
NOVEL 3-CYCLOPENTYL ETHERS OF 13-ALKYL-GON-POLY-ENES
Reinhardt P. Stein, Conshohocken, and Herchel Smith, Bryn Mawr, Pa., assignors to American Home Products Corporation, New York, N.Y.
No Drawing. Continuation-in-part of application Ser. No. 806,705, Mar. 12, 1969, which is a continuation-in-part of application Ser. No. 699,785, Jan. 23, 1968. This application Dec. 19, 1969, Ser. No. 886,795
Int. Cl. C07c 173/00
U.S. Cl. 260—239.55 R                    27 Claims

ABSTRACT OF THE DISCLOSURE

This invention is concerned with the 3-cyclopentyloxy derivatives of 13-(lower)alkyl-1,3,5(10),8-tetraenes; 13-polycarbonalkyl-8α-gona - 1,3,5(10) - trienes; 13-polycarbonalkyl-16α-hydroxygona - 1,3,5(10)-trienes; 13-(lower)alkylgona-1,3,5(10)-trienes; 13 - polycarbonalkylgona-1,3, 5(10),16 - tetraenes; 13 - (lower)alkylgona-1,3,5(10),6,8-pentaenes; and 13-polycarbonalkylgona-1,3,5(10),9(11)-tetraenes; which are pharmacologically active as long-acting estrogens.

This is a continuation-in-part application of now abandoned U.S. patent application Ser. No. 806,705, entitled "Novel 3-Cyclopentyl Ethers of 13-Polycarbonalkylgonatrienes, 13-Polycarbonalkyltetraenes and Related Compounds," filed on Mar. 12, 1969, by Reinhardt P. Stein and Herchel Smith, which in turn is a continuation-in-part application of abandoned U.S. patent application Ser. No. 699,785, entitled "Novel 3-Cyclopentyl Ethers of 13-Polycarbonalkyl-Gonatrienes and 13-Polycarbonalkyltetraenes," filed on Jan. 23, 1968, by Reinhardt P. Stein and Herchel Smith.

This invention relates to new and novel 3-cyclopentyl ethers of 13-polycarbonalkylgonatrienes; 13-(lower)alkylgonatrienes, 13-polycarbonalkylgonatetraenes, 13-(lower) alkylgonatetraenes and 13-(lower)alkylgonapentaenes. In particular, it is concerned with 13-(lower)alkyl-3-cyclopentyloxygona-1,3,5(10),8-tetraenes;
13-polycarbonalkyl-3-cyclopentyloxy-8α-gona-1,3,5(10)-trienes;
13-polycarbonalkyl-3-cyclopentyloxy-16α-hydroxygona-1,3,5(10)-trienes;
13-(lower)alkyl-3-cyclopentyloxygona-1,3,5(10)-trienes;
13-polycarbonalkyl-3-cyclopentyloxygona-1,3,5(10),16-tetraenes;
13-(lower)alkyl-3-cyclopentyloxygona-1,3,5(10),6,8-pentaenes; and
13-polycarbonalkyl-3-cyclopentyloxygona-1,3,5(10), 9(11)-tetraenes, which are pharmacologically efficacious as sustained acting estrogens.

The new and novel 3-cyclopentyloxy steroids of the present invention are exemplified by the following formulae:

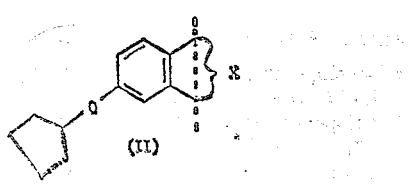

wherein X is a moiety selected from the group consisting of

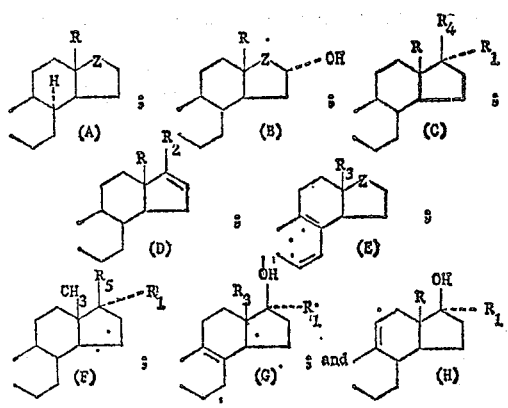

wherein R is polycarbonalkyl; Z is selected from the group consisting of β-hydroxymethylene, carbonyl, α-ethynyl-β-hydroxymethylene, α-chloroethynyl-β-hydroxymethylene, and α-(lower)alkyl-β-hydroxymethylene; $R_1$ is selected from the group consisting of lower alkyl, chloroethynyl and ethynyl; $R_2$ is lower alkanoyloxy; $R_3$ is lower alkyl; $R_4$ is selected from the group consisting of hydroxy, lower alkanoyloxy and tetrahydropyran-2-yloxy; and $R_5$ is selected from the group consisting of lower alkanoyloxy and tetrahydropyran-2-yloxy. As employed herein, the term "(lower)alkyl" is meant to include moieties containing from about one to about eight carbon atoms, while the term "polycarbonalkyl" is meant to include those moieties containing from two to about eight carbon atoms.

Typical examples of the compounds of this invention are compounds of Formula II having the formula:

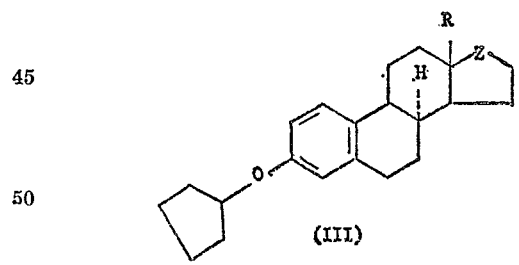

wherein R and Z are as set forth previously, particularly 3-cyclopentyloxy - 13 - ethyl-8α-gona-1,3,5(10)-trien-17-one; 3-cyclopentyloxy-13-ethyl - 8α-gona-1,3,5,(10)-trien-17β-ol and 3-cyclopentyloxy - 13 - ethyl - 17α-ethynyl-8α-gona-1,3,5(10)-trien-17β-ol and compounds of Formula II having the formula:

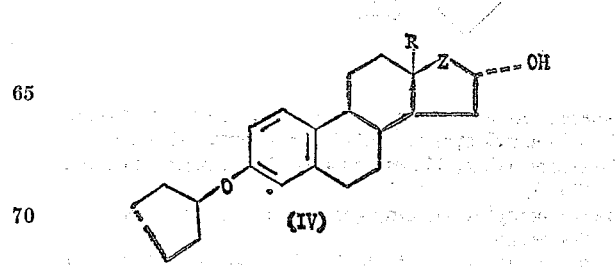

wherein R and Z are as set forth previously, particularly
3-cyclopentyloxy-13-ethylgona-1,3,5(10)-triene-16α,17β-diol;
3-cyclopentyloxy-13-ethyl-16α-hydroxygona-1,3,5(10)-trien-17-one; and
3-cyclopentyloxy-13-ethyl-17α-ethynylgona-1,3,5(10)-trien-16α,17β-diol and compounds of Formula II having the formula:

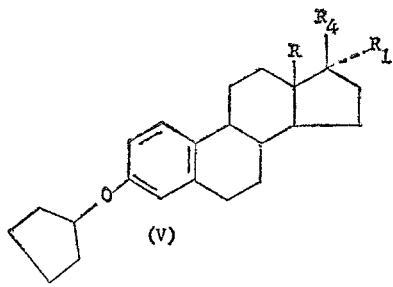
(V)

wherein R, $R_1$ and $R_4$ are as set forth previously, particularly
3-cyclopentyloxy-13-ethyl-17α-ethynylgona-1,3,5(10)-trien-17β-ol;
17α-chloroethynyl-3-cyclopentyloxy-13-ethylgona-1,3,5(10)-trien-17β-ol;
d-3-cyclopentyloxy-13-ethyl-17α-ethynylgona-1,3,5(10)-trien-17β-ol, acetate;
3-cyclopentyloxy-13-ethyl-17α-ethynylgona-1,3,5(10)-trien-17β-ol; and
3-cyclopentyloxy-13-ethyl-17α-ethynyl-17β-(tetrahydropyran-2-yloxy)-gona-1,3,5(10)-triene.

and compounds of Formula II having the formula:

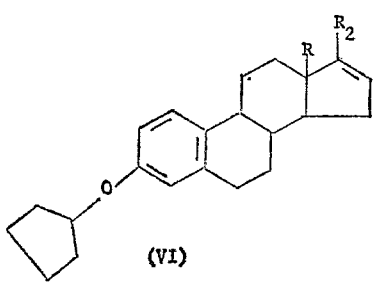
(VI)

wherein R and $R_2$ are as set forth previously, particularly
3 - cyclopentyloxy - 13-ethylgona-1,3,5(10),16-tetraen-17-ol, acetate and compounds of Formula II having the formula:

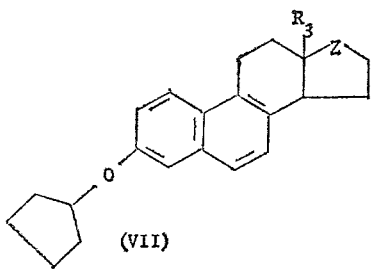
(VII)

wherein $R_3$ and Z are set forth previously, particularly
3-cyclopentyloxyestra-1,3,5(10),6,8-pentaen-17-one:
3-cyclopentyloxy-17α-ethynylestra-1,3,5(10),6,8-pentaen-17β-ol;
3-cyclopentyloxy-13-ethylgona-1,3,5(10),6,8-pentaen-17-one; and
3-cyclopentyloxy-13-ethyl-17α-ethynylgona-1,3,5(10),6,8-pentaen-17β-ol and compounds of Formula II having the formula:

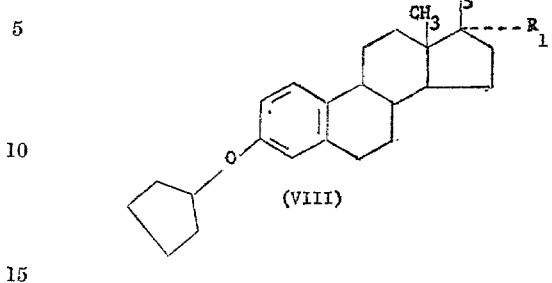
(VIII)

wherein $R_1$ and $R_5$ are as previously set forth, particularly
d-3-cyclopentyloxy-17α-ethynylestra-1,3,5(10)-trien-17β-ol, acetate;
d-3-cyclopentyloxy-17α-ethynylestra-1,3,5(10)-trien-17β-ol, formate; and
d-3-cyclopentyloxy-17α-ethynyl-17β-(tetrahydropyran-2-yloxy)-estra-1,3,5(10)-triene and compounds of Formula II having the formula:

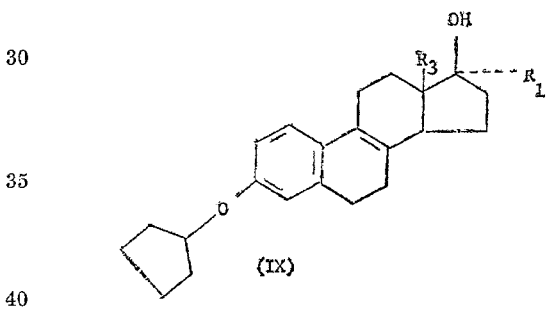
(IX)

wherein $R_1$ and $R_3$ are as previously set forth, particularly
d-3-cyclopentyloxy-13-ethyl-17α-ethynylgona-1,3,5(10),8-tetraen-17β-ol;
d-3-cyclopentyloxy-13-ethyl-17α-ethynylgona-1,3,5(10),8-tetraen-17β-ol-methanolate;
d-3-cyclopentyloxy-17α-ethynylestra-1,3,5(10),8-tetraen-17β-ol; and
d-3-cyclopentyloxy-17α-ethynylestra-1,3,5(10),8-tetraen-17β-ol, isopropanolate and compounds of Formula II having the formula:

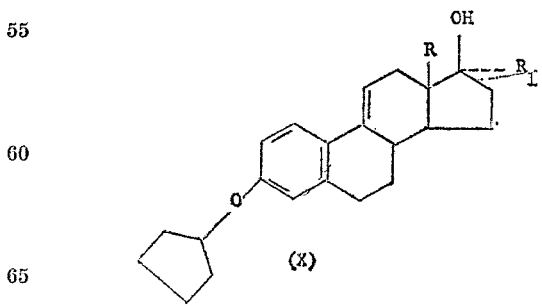
(X)

wherein R and $R_1$ are as previously set forth, particularly
d-3-cyclopentyloxyl-13-ethyl-17α-ethynylgona-1,3,5(10),9(11)-tetraen-17β-ol;
3-cyclopentyloxy-13-ethyl-17α-ethynylgona-1,3,5(10),9(11)-tetraen-17β-ol, hemi-isopropanolate;
3-cyclopentyloxy-13-ethyl-17α-ethynylgona-1,3,5(10),9(11)-tetraen-17β-ol.

The new and novel 3-cyclopentyloxy steroids of the present invention may be prepared by the process which is hereinafter exemplified:

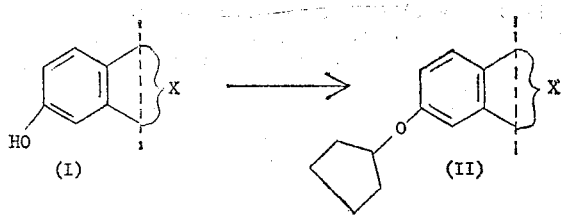

wherein X is as defined above. The reaction is effected by contacting an appropriate 3-hydroxy steroid (I) with a cyclopentyl halide, in the presence of an alkali metal alkoxide, e.g. sodium methoxide and potassium ethoxide in an alkanol, e.g. methanol, ethanol and isopropanol, at a temperature range from about 50° C. to about reflux temperature for a period of about one to about five hours. Preferably, this reaction is conducted with cyclopentyl bromide, in the presence of sodium methoxide, in absolute ethanol at reflux temperatures.

When the reaction is complete, the resulting 3-cyclopentyloxy steroid (II) is separated by standard recovery procedures. For example, the reaction mixture is cooled, concentrated, digested with a water-immiscible organic solvent mixture, then the organic layer is dried, evaporated to dryness and the residue recrystallized from a suitable solvent to afford the product (II).

Alternatively, the new and novel 3-cyclopentyl ethers of 13-polycarbonalkylgonatrien-17-ols and 13-polycarbonalkylgonatetraen-17-ols may be prepared by the reduction of their corresponding 3-cyclopentylethers of 13-polycarbonalkylgonatrien - 17 - ones and 13-polycarbonalkylgonatetraen-17-ones. This reaction is effected by contacting an appropriate 3-cyclopentyl ether of a 13-polycarbonalkylgonatrien-17-one or 13-polycarbonalkylgonatetraen-17-one with an alkali metal borohydride in an alkanol at about room temperature for several hours. When the reduction is complete, the resulting product is separated by conventional procedures. For example, the reaction mixture is admixed with water to precipitate the product which is then collected by filtration and recrystallized from a suitable solvent, e.g. an alkanol.

The 13 - (lower)alkyl - 3-cyclopentyloxy-17α-ethynyl-1,3,5(10),8 - tetraen-17β-ols; the 13-polycarbonalkyl-3-cyclopentyloxy - 17α - ethynyl - 8α-gona-1,3,5(10)-trien-17β - ols; the 13 - polycarbonalkyl-3-cyclopentyloxy-17α-ethynylgona - 1,3,5(10)-trien-16α,17β-diols; and the 13-polycarbonalkyl - 3 - cyclopentyloxy-17α-ethynyl-gona-1,3,5(10) - trien-17β-ols and 1,3,5(10),6,8-pentaen-17β-ols of this invention may also be prepared by contacting the corresponding 17-ketosteroid with an excess of lithium acetylide-ethylene diamine in dry dimethylsulfoxide under at atmosphere of acetylene at about room temperature for a period of about fifteen minutes to about four hours. When the reaction is complete, the appropriate 17α-ethynyl-17β-hydroxysteroid is separated by routine methods. For example, the reaction mixture is poured into ice-water, extracted with a water-immiscible solvent, which is then washed, dried and evaporated to dryness to afford the product as a residue.

The procedure for converting an appropriate 13-polycarbonalkyl-3-cyclopentyloxy-17-ketosteroid to its corresponding 13 - polycarbonalkyl - 17α - chloroethynyl-3-cyclopentyloxy-17β-hydroxysteroid, as illustrated in Example X, is described by Hannah et al., in J.A.C.S. 83, 4663 (1961). The procedure employed to prepare a 13-polycarbonalkyl - 3 - cyclopentyloxygona-1,3,5(10),16-tetraen-17-ol acylate from its corresponding 13-polycarbonalkyl - 3 - cyclopentyloxygona - 1,3,5(10)-trien-17-one, as shown in Example XI, is described by Leeds et al., in J.A.C.S. 76, 2943 (1954). The method exemplified in Example VII to convert a 13 - polycarbonalkyl-3-cyclopentyloxygona-1,3,5(10),16-tetraen-17-ol acylate to its corresponding 13 - polycarbonalkyl - 3 - cyclopentyloxygona - 16α - hydroxygona-1,3,5(10)-trien-17-one is described by Biggerstaff et al., in J.O.C. 22, 1220 (1957). The process depicted in Example IX to convert a 13-polycarbonalkyl-3-cyclopentyloxy-17-ketosteroid to an appropriate 17α - alkyl - 13 - polycarbonalkyl-3-cyclopentyloxy-17β-hydroxysteroid is described by Henbest et al., in J.C.S., Pg. 1190 (1951). Many of the steroids employed as starting compounds are commercially available while others are prepared by procedures known in the art of steroid chemistry. The 13-polycarbonalkyl-3-cyclopentyloxy-8α-gona-1,3,5(10)-trien-17-ones may be prepared by the process described in U.S. Pat. No. 3,407,217, issued on October 22, 1968, to Gordon Alan Hughes and Herchel Smith and entitled "8-Iso-13-Polycarbonalkyl Gonanes." The 13 - polycarbonalkylgona - 1,3,5(10)-triene-3,16α-17β-triols and the 13-polycarbonalkyl-3-hydroxygona-1,3,5(10)-triene-17-ones are prepared by the procedure described in U.S. Pat. 3,519,714 issued on July 7, 1970, and entitled "Synthesis of Gona-1,3,5(10)-Trienes." The 13-(lower)alkyl-3-hydroxygona-1,3,5(10), 8-tetraen-17-one starting compounds may be prepared by the procedure described in U.S. Pat. 3,391,169 issued on July 2, 1968 to Gordon Alan Hughes and Herschel Smith and entitled "13-Alkylgona-1,3,5(10),8-Tetraenes." Using a convention approved by Fieser and Fieser, "Steroids," p. 336 (1959), compounds designated as the d-forms are the enantiomers corresponding in configuration at C–13 to that of the natural horomone estrone. The corresponding enantiomorphs are consequently designated the l-forms and the racemates the dl-forms. Racemates will be depicted by structurel formulas which show only the enantiomorphs of the d-configuration. It is understood that either the dl-steroids or the specific d- or l-isomers may be empolyed as starting materials with like chemical results.

The new and novel 3-cyclopentyloxy steroids of the present invention have been found to posses interesting properties which render them useful as synthetic medicinals. More particularly, these compounds, in standard pharmacological tests, have exhibited utility as long lasting estrogenic agents.

The compounds of the present invention are of a particular value for such purposes because they exhibit excellent estrogenic responses, have a rapid onset of action, long lasting effect, and low toxicity. Further, the 3-cyclopentyloxy steroid compounds of this invention which have a 17α-ethynyl; a 17α-chloroethynyl or a 17α-lower alkyl substituent have been demonstrated to possess this long lasting estrongenic activity when orally administered. As estrogenic agents, all the 3-cyclopentyloxy steroid compounds of this invention are medicinally useful in replacement therapy in estrogen deficiency. Further, they are useful in suppression of lactation, prophylaxis and treatment of mumps orchitis, treatment of atherosclerosis and senile osteoporosis. For veterinary purposes, the 3-cyclopentyloxy steroids of this invention are useful in replacement therapy for underdevolped females; incontenence, vaginitis of sprayed bitches. In uterine inerita, pyometra and in retained fetal membranes.

When the 3-cyclopentyloxy steroids of this invention are employed as estrongenic agents in warm-blooded animals, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, certain types of clay, and so forth. They may also be administered orally in the form of solutions which may contain coloring and flavoring agents or they may be injected parenterally. For parenteral administration, they may be used in the form of a sterile solution containing other solutes; for example, enough saline or glucose to make the solution isotonic.

This dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 0.02 mcgm. to about 500 mcgm. per kilo per day, although as aforementioned variations will occur. However, a dosage level that is in the range of from about 0.02 cmgm. to about 200 mcgm. per kilo per day is most desirably employed in order to achieve effective results.

The following examples are given by way of illustration.

EXAMPLE I

Dissolve dl-13-ethylgona - 1,3,5(10) - triene-3,16α,17β-triol (2.00 g.) in a solution of sodium methoxide (600 mg.) in absolute ethanol (50 ml.) then add cyclopentyl bromide (2.5 g.) and reflux for two hours. Cool the solution, remove the ethanol in vacuo and digest the residue with water and ethyl acetate. Wash the organic layer with water, brine and dry it over anhydrous sodium sulfate. Filter, remove the solvent in vacuo then treat the residue in tetrahydrofuran solution with Nuchar charcoal. Filter through super cel, remove the solvent in vacuo and dissolve the residue in ether. Let stand, filter, remove the ether from the filtrate in vacuo and crystallize the residue from isopropanol. Filter to obtain 1.00 g. of dl-3-cyclopentyloxy - 13 - ethylgona-1,3,5(10)-triene-16α,17β-diol as an isopropanol solvate, M.P. 99–100° C.;

$\lambda_{max.}^{KBr}$ 3.13μ

Analysis.—Calcd. for $C_{24}H_{34}O_3 \cdot C_3H_8O$ (percent): C, 75.31; H, 9.83. Found (percent): C, 75.10; H, 9.65.

Similarly, dl-3-cyclopentyloxy-13-propylgona - 1,3(10)-triene-16α,17β-diol is synthesized.

EXAMPLE II

Dissolve dl-13-ethyl - 3 - hydroxy-8α-gona-1,3,5(10)-trien-17-one (6.00 g.) in a solution of sodium methoxide (1.30 g.) in absolute ethanol (260 ml.) and stir at reflux temperature to completely dissolve the solids. Add cyclopentyl bromide (7.0 g.) and reflux for four hours. Cool, remove the ethanol in vacuo and digest the residue with water and ethyl acetate. Wash the organic layer with water and brine then dry over anhydrous sodium sulfate, filter, remove the solvent in vacuo and dissolve the residue in benzene. Pass the solution through a column of Florex XXS, remove the solvent in vacuo and dissolve the residue in chloroform. Pass the solution through a column of silica gel, remove the solvent in vacuo and crystallize the residue from methanol. Filter to obtain 3.78 g. of the product. Dissolve a sample (1.00 g.) in methylene chloride, treat with Nuchar charcoal, filter through super cel then replace the solvent with isopropanol by boiling. Seed and allow the solution to stand to obtain 0.89 g. of the pure dl-3-cyclopentyloxy-13-ethyl - 8α - gona-1,3,5(10)-triene-17-one, M.P. 133–134° C.;

$\lambda_{max.}^{KBr}$ 5.78μ

Analysis.—Calcd. for $C_{24}H_{32}O_2$ (percent): C, 81.77; H, 9.17. Found (percent): C, 81.62; H, 9.00.

Repeating the above procedure, dl-13-butyl-3-hydroxy-8α-gona-1,3,5(10)-trien-17-one is converted to dl-13-butyl-3-cyclopentyloxy-8α-gona-1,3,5(10)-trien-17-one.

EXAMPLE III

Add dl-3-cyclopentyloxy-13-ethyl - 8α - gona-1,3,5(10)-trien-17-one (2.00 g.) to methanol (150 ml.), stir, then add sodium borohydroxide (2.0 g.) in small portions to the reaction over a period of one hour. Stir the reaction at room temperature a further two hours then add water (200 ml.) dropwise to completely precipitate the product. Filter and dry the solid, dissolve it in methylene chloride, treat with Nuchar charcoal, filter through super cel and remove the solvent in vacuo. Dissolve the residue in methanol then with stirring add water dropwise to precipitate the product. Filter and dry to obtain 1.27 g. of dl-3-cyclopentyloxy - 13 - ethyl - 8α - gona-1,3,5(10)-trien-17β-ol, M.P. 100–101° C.;

$\lambda_{max.}^{KBr}$ 3.02μ

Analysis.—Calcd. for $C_{24}H_{34}O_2$ (percent): C, 81.31; H, 9.67. Found (percent): C, 81.48; H, 9.48.

In like manner, dl-13-butyl - 3 - cyclopentyloxy-8α-gona-1,3,5(10)-trien-17-one is converted to dl-13-butyl-3-cyclopentyloxy-8α-gona-1,3,5(10)-trien-17β-ol.

EXAMPLE IV

Dissolve dl-3-cyclopentyloxy - 13 - ethylgona-1,3,5(10)-trien-17-one (3.00 g.) in dry dimethylsulfoxide (80 ml.) and saturate with purified acetylene by bubbling the gas through the solvent for half an hour. Add lithium acetylide-ethylene diamine (1.5 g.) and stir the reaction under an atmosphere of acetylene at room temperature for one and a half hours. Again add lithium acetylide-ethylene diamine (1.5 g.) and stir for another one and a half hours. Pour the reaction onto ice then extract the mixture with ether-ethyl acetate and wash the extract with water and brine. Dry the solution over anhydrous sodium sulfate, filter and remove the solvent in vacuo. Dissolve the oil in benzene, pass the solution through a column of Florex XXS and remove the solvent in vacuo to obtain 1.75 g. of dl-3-cyclopentyloxy - 13 - ethyl-17α-ethynylgona - 1,3,5(10)-triene-17-ol;

$\lambda_{max.}^{KBr}$ 3.0 and 3.1μ

Similarly, dl-13-butyl-3-cyclopentyloxy - 17α - ethynylgona-1,3,5(10)-triene-17β-ol is prepared.

EXAMPLE V

Dissolve dl - 13 - ethyl-17-methylgona-1,3,5(10)-triene-3,17β-diol (5.00 g.) in a solution of sodium methoxide (1.50 g.) in absolute ethanol (100 ml.) then add cyclopentyl bromide (5.0 g.) and reflux for two hours. Cool, remove the solvent in vacuo, digest the residue with water and ethyl acetate, wash the organic layer with water and brine and then dry over anhydrous sodium sulfate. Filter, evaporate the solvent in vacuo to afford dl-3-cyclopentyloxy - 13-ethyl-17-methygona-1,3,5(10)-triene-17β-ol.

In like manner, dl-13,17-diethylgona-1,3,5(10)-triene-3,17β-diol is converted to dl-3-cyclopentyloxy-13,17-diethylgona-1,3,5(10)-trien-17β-ol and dl-13-butyl-17-propylgona-1,3,5(10)-triene-3,17β-diol is converted to dl-13-butyl - 3 - cyclopentyloxy-17-propylgona-1,3,5(10)-trien-17β-ol.

EXAMPLE VI

Dissolve dl-3-cyclopentyloxy - 13-ethyl-8α-gona-1,3,5(10)-trien-17-one (1.93 g.) in dry dimethyl sulfoxide (30 ml.) and bubble purified acetylene gas through the stirred solution for forty-five minutes. Add lithium acetylide-ethylene diamine (2.0 g.) and continue stirring the mixture under acetylene at room temperature for two hours. Pour the reaction into water, filter the resulting solid onto super cel and air-dry the mixture. Extract the mixture of solids with methylene chloride, filter and remove the solvent in vacuo. Dissolve the resulting oil in 1:1-hexane-benzene mixture and pass the solution through a column of Florex XXS then remove the solvent in vacuo. Dissolve the resulting oil in hexane and repeat the above treatment to obtain 1.05 g. of dl-3-cyclopentyloxy-13-ethyl-17α-ethynyl-8α-gona - 1,3,5(10) trien-17β-ol:

$\lambda_{max}^{KBr}$. 2.96 and 3.04μ

*Analysis.*—Calcd. for $C_{26}H_{34}O_2$ (percent): C, 82.49; H, 9.05. Found (percent): C, 82.61; H, 9.30.

In the same manner, dl-13-butyl-3-cyclopentyloxy-8α-gona-1,3,5(10)-trien-17-one is converted to dl-13-butyl-3-cyclopentyloxy-17α-ethynyl - 8α - gona-1,3,5(10)-trien-17β-ol.

EXAMPLE VII

Dissolve dl-3-cyclopentyloxy - 13-ethylgona-1,3,5(10), 16-tetraen-17-ol, acetate, prepared by the procedure of Example XI, (2.50 g.) in benzene (100 ml.), cool with an ice-bath, add m-chloroperbenzoic acid (2.0 g.) and then stir the mixture at room temperature for four hours. Dilute with ether, wash with 5% potassium carbonate solution, water and brine and dry over anhydrous sodium sulfate. Filter, remove the solvent in vacuo and dissolve the resulting oil in methanol (250 ml.) containing 3 molar sulfuric acid (75 ml.). Allow the reaction to stand at room temperature for four days then evaporate the solvents to one-third volume in vacuo. Dilute with water then filter and air-dry the resulting white crystalline solid. Dissolve the solid in methylene chloride, treat with charcoal and filter. Remove the solvent in vacuo and crystallize the residue from methanol to obtain 1.59 g. of product; M.P. 160–162° C. Further purify at 0.30 g. sample by the above procedure to obtain from isopropanol, 0.22 g. of dl-3-cyclopentyloxy-13-ethyl-16α-hydroxygona-1,3,5(10)-trien-17-one, M.P. 163–165° C.;

$\lambda_{max}^{KBr}$. 3.0 and 5.75μ

*Analysis.*—Calcd. for $C_{24}H_{32}O_3$ (percent): C, 78.22; H, 8.75. Found (percent): C, 77.93; H, 8.78.

In the same manner the 13-propyl and 13-butyl homologs of the above product are synthesized.

EXAMPLE VIII

Dissolve dl-3-cyclopentyloxy - 13-ethyl-16α-hydroxy-gona-1,3,5(10)-trien-17-one (1.17 g.), prepared in Example VII, in dry methylsulfoxide (25 ml.) then bubble purified acetylene through the stirring solution for one hour. Add lithium acetylide-ethylene diamine (1.00 g.) and continue to stir the mixture under acetylene at room temperature for four hours. Pour the reaction into ice-water, extract the mixture with ether then wash, dry and evaporate the solvent in vacuo. Dissolve the residue in 1:1-hexane-benzene and pass the solution through a column of Florex XXS. Elute the product by washing the column with ether and remove the solvent in vacuo. Dissolve the residue by boiling with hexane containing just enough ether to solubilize the product. Let stand to obtain 0.35 g. of dl-3-cyclopentyloxy-13-ethyl-17α-ethynyl-gona-1,3,5(10)-triene-16α,17β-diol, M.P. 150–152° C.

*Analysis.*—Calcd. for $C_{26}H_{34}O_3$ (percent): C, 79.15; H, 8.69. Found (percent): C, 78.87; H, 8.82.

Employing the above procedure, the following compounds are prepared:

dl-3-cyclopentyloxy-17α-ethynyl-13-propylgona-1,3,5(10)-triene-16α,17β-diol;
dl-3-cyclopentyloxy-17α-ethynyl-13-isopropylgona-1,3,5(10)-triene-16α,17β-diol; and
dl-13-butyl-3-cyclopentyloxy-17α-ethynylgona-1,3,5(10)-triene-16α,17β-diol.

EXAMPLE IX

Add dl-3-cyclopentyloxy-13 - ethylgona-1,3,5(10),7-tetraen-17-one (1.50 g.) in tetrahydrofuran (10 ml.) to methyl lithium (15 ml. of a 1.6 M solution in ether) diluted with dry ether (100 ml.). Stir the reaction mixture four hours, chill in an ice bath and add cold aqueous ammonium chloride solution (50 ml.). Wash, dry and evaporate the organic layer and recrystallize the residue two times from ether to provide dl-3-cyclopentyloxy-13-ethyl-17α-methylgona-1,3,5(10),7-tetraen-17β-ol, (0.450 g.), M.P. 143–145° C.;

$\lambda_{max}^{KBr}$. 3.0, 6.25μ

*Analysis.*—Calcd. for $C_{25}H_{34}O_2$ (percent): C, 81.92; H, 9.35. Found (percent): C, 81.99; H, 9.31.

Similarly, dl-3-cyclopentyloxy-17 - methyl-13-propyl-gona-1,3,5(10),7-tetraen-17β-ol and dl-13-butyl-3-cyclopentyloxy-17-methylgona - 1,3,5(10),7-tetraen-17β-ol are synthesized.

EXAMPLE X

Add dl-3-cyclopentyloxy-13-ethylgona-1,3,5(10)-trien-17-one (1.0 g.) in dry tetrahydrofuran (10 ml.) to excess lithium chloroacetylide [prepared from methyl lithium (25 ml. of 1.6 M in ether) and cis-dichloroethylene (1.82 g.)] in dry ether (100 ml.). Stir the reaction mixture for four hours, chill in an ice bath and add saturated aqueous ammonium chloride (50 ml.). Wash, dry and evaporate the organic phase. Dissolve the residue in 50–50 petroleum ether-benzene and filter through Grade 1 neutral alumina. Evaporate the filtrate under vacuum to obtain dl-3-cyclopentyloxy-17α - chloroethynyl-13-ethyl-gona-1,3,5(10)-trien-17β-ol, as a white glass (0.175 g.);

$\lambda_{max}^{KBr}$. 3.0, 4.50, 6.25μ

*Analysis.*—Calcd. for $C_{26}H_{31}ClO_2$ (percent): C, 76.00; H, 7.60; Cl, 7.59. Found (percent): C, 76.66; H, 8.22; Cl, 7.58.

In like manner, dl-3-cyclopentyloxy-13-propylgona-1,3,5(10)-trien-17-one is reacted to afford dl-3-cyclopentyloxy-17α-chloroethynyl-13 - propylgona - 1,3,5(10)-trien-17β-ol.

EXAMPLE XI

Dissolve dl - 3-cyclopentyloxy-13-ethylgona-1,3,5(10)-trien-17-one (5.00 g.) in isopropenyl acetate (50 ml.) then add 5 ml. of a solution prepared by carefully mixing concentrated sulfuric acid (10 drops) with isopropenyl acetate (10 ml.). Reflux the reaction for one hour then slowly distil over a period of five hours to remove 45 ml. of distillate. Cool, dilute with benzene then wash the extract with saturated sodium bicarbonate solution, water, brime and dry over anhydrous sodium sulfate. Filter, remove the solvent in vacuo and dissolve the residue in boiling hexane. Cool and pass the solution through a column of Florex XXS. Remove the solvent in vacuo, triturate the residue with methanol and filter to obtain 3.00 g. of dl-3-cyclopentyloxy-13-ethylgona-1,3,5(10),16-tetraen-17-ol, acetate, M.P. 120–121° C.;

$\lambda_{max}^{KBr}$. 5.70μ

*Analysis.*—Calcd. for $C_{26}H_{34}O_3$ (percent): C, 79.15; H, 8.69. Found (percent): C, 79.12; H, 8.70.

In the same manner, dl-13-butyl-3-cyclopentyloxygona-1,3,5(10)-trien-17-one is reacted with isopropyenyl butyrate to afford dl-13-butyl-3-cyclopentyloxygona-1,3,5(10), 16-tetraen-17-ol (butyrate).

EXAMPLE XII

Repeating the procedure of Example X to react an appropriate 13 - polycarbonalkyl-3-cyclopentyloxygon-17-one with lithium chloroacetylide, the following compounds are prepared:

dl-17α-chloroethynyl-3-cyclopentyloxy-13-ethylgona-1,3,5(10)-triene-16α,17β-diol; and
dl-17α-chloroethynyl-3-cyclopentyloxy-13-ethyl-8α-gona-1,3,5(10)-trien-17β-ol.

EXAMPLE XIII

When the procedure of Example IX is repeated employing appropriate 13-polycarbonalkyl-3-cyclopentyloxygon-17-ones, the following compounds are obtained:

dl-3-cyclopentyloxy-13-ethyl-17α-methylgona-1,3,5(10)-triene-16α,17β-diol; and dl-3-cyclopentyloxy-13-butyl-17α-methyl-8α-gona-1,3,5(10)-trien-17β-ol.

EXAMPLE XIV

Dissolve d - 3 - cyclopentyloxy-13-ethylgona-1,3,5(10)-trien-17-one (1.05 g.) in dry dimethyl sulfoxide (40 ml.) saturated with acetylene and add lithium acetylide-ethylene diamine complex (1.0 g.) and stir for two hours. Add another 1.0 g. of complex, stir two hours, pour onto ice, extract with ether, wash, dry and evaporate to a residue. Dissolve in ethyl acetate (50 ml.) containing acetic anhydride (4.8 ml.) and perchloric acid (.05 ml.) allow to stand two minutes, wash with aqueous $NaHCO_3$ and evaporate to a residue. Recrystallize from methanol and then methanol-ethanol to provide the product, d-3-cyclopentyloxy - 13-ethyl-17-ethynylgona-1,3,5(10)-trien-17β-ol, acetate, 0.550 g., M.P. 101–104° C., $\lambda_{max.}^{KBr}$ 2.97, 3.11, 5.77μ; $\lambda_{max.}^{EtOH}$ 278 mμ (ε 1,700), $[\alpha]_D^{25}$= −12° (c.=1, chf.)

Analysis.—Calcd. for $C_{28}H_{36}O_3$ (percent): C, 79.96; H, 8.63. Found (percent): C, 79.81; H, 8.34.

EXAMPLE XV

Prepare a fresh solution of acetic anhydride (48 ml.) and 70% aqueous perchloric acid (0.5 ml.) in ethyl acetate (500 ml.) then add d-3-cyclopentyloxy-17α-ethynylestra-1,3,5(10)-trien-17β-ol (6.00 g.) and swirl at room temperature for two minutes. Quench with saturated sodium bicarbonate solution. Wash the extract with sodium bicarbonate, brine and dry over sodium sulfate. Filter and evaporate in vacuo then dissolve the residue in methanol (300 ml.), add pyridine (1 ml.) and gently boil for five minutes. Cool, remove the solvent in vacuo then add toluene. Evaporate in vacuo and pump the residue dry. Boil the residue with methanol and let stand, then filter to obtain the crude product. Dissolve the solid in benzene, pass through Florex then remove the benzene in vacuo. Treat the residue in methylene chloride with decolorizing charcoal, filter and replace the solvent with absolute ethanol by boiling. Cool and filter to obtain 3.50 g. of pure product, d-3-cyclopentyloxy-17α-ethynylestra-1,3,5-(10)-trien-17β-ol, acetate, M.P. 134–136° C.;

$\lambda_{max.}^{KBr}$ 3.14, 4.79 and 5.78μ $[\alpha]_D^0$ (c.=1, chf.)

Analysis.—Calcd. for $C_{27}H_{34}O_3$ (percent): C, 79.76; H, 8.43. Found (percent): C, 80.07; H, 8.11.

EXAMPLE XVI

Prepare a fresh solution of acetic anhydride (9 ml.) and 70% perchloric acid (0.1 ml.) in ethyl acetate (100 ml.) then add dl-3-cyclopentyloxy-13-ethyl-17α-ethynylgona-1,3,5(10)-trien-17β-ol (0.75 g.). Swirl at room temperature for three minutes then quickly quench with saturated sodium bicarbonate solution. Wash the extract with saturated sodium bicarbonate and brine then dry over sodium sulfate. Filter and evaporate the solvent in vacuo. Add methanol containing pyridine, boil gently for five minutes then cool and evaporate in vacuo. Pump the residue dry and dissolve in methylene chloride, treat with decolorizing charcoal, filter and remove the solvent in vacuo. Crystallize the residue from methanol to get 0.65 g. of the product, dl-3-cyclopentyloxy-13-ethyl-17α-ethynylgona-1,3,5(10)-trien-17β-ol, acetate; M.P. 156–158° C.;

$\lambda_{max.}^{KBr}$ 3.12 and 5.76μ

Analysis.—Calcd. for $C_{28}H_{36}O_3$ (percent): C, 79.96; H, 8.63. Found (percent): C, 80.29; H, 8.83.

EXAMPLE XVII

Cool dimethylformamide (60 ml.) in a methanol-ice bath then carefully add phosphorus oxychloride (9 ml.) dropwise and with stirring. Add d-3-cyclopentyloxy-17α-ethynylestra-1,3,5(10)-trien-17β-ol (3.0 g.) and remove the ice bath. Stir the reaction at room temperature for thirty minutes, then pour into ice-water containing pyridine (50 ml.). Stir and extract with ether, then wash, dry and evaporate the extract in vacuo. Boil the residue with methanol then let stand to crystallize. Filter to obtain 2.55 g. of crude product, M.P. 100–102° C. Dissolve the solid in benzene, pass the solution through Florex then remove the benzene in vacuo. Treat the resulting oil in methylene chloride with decolorizing charcoal, filter and remove the solvent in vacuo. Dissolve the oil in warm absolute ethanol, seed and let stand. Filter to obtain 1.31 g. of pure product, d-3-cyclopentyloxy-17α-ethynylestra-1,3,5(10)-trien-17β-ol, formate; M.P. 104–106° C.;

$\lambda_{max.}^{KBr}$ 3.09 and 5.83μ $[\alpha]_D^{-6°}$ (c.=1% in chf.)

Analysis.—Calcd. for $C_{26}H_{32}O_3$ (percent): C, 79.55; H, 8.22. Found (percent): C, 79.23; H, 7.94.

EXAMPLE XVIII

Thoroughly dry a sample of d-3-cyclopentyloxy-17α-ethynylestra-1,3,5(10)-trien-17β-ol (2.00 g.) then dissolve in distilled dihydropyran (25 ml.). Cool with a methanol-ice bath then add phosphorus oxychloride (10 drops) and gently warm on the steam bath for one-half hour. Cool and let the reaction stand at room temperature for eighteen hours. Add solid sodium methoxide (0.40 g.), stir and dilute with ether. Wash, dry and evaporate the extract in vacuo. Triturate the resulting solid with methanol and filter to get 2.23 g. of crude product, M.P. 156–159° C. Treat the solid in methylene chloride with decolorizing charcoal, filter and replace the solvent with absolute ethanol by boiling. Let stand to complete crystallization. Filter to obtain 1.82 g. of pure product, d-3-cyclopentyloxy-17α-ethynyl - 17β - (tetrahydropyran-2-yloxy)estra-1,3,5(10)-triene; M.P. 164–166° C.;

$\lambda_{max.}^{KBr}$ 3.17μ $[\alpha]_D$−24° (c.=1% in chf.)

Analysis.—Calcd. for $C_{30}H_{40}O_3$ (percent): C, 80.31; H, 8.99. Found (percent): C, 80.41; H, 8.87.

EXAMPLE XIX

Dissolve dl-3-cyclopentyloxy-13-ethyl-17α-ethynylgona-1,3,5(10)-trien-17β-ol (3.0 g.) in distilled dihydropyran (50 ml.) and cool with an ice-bath, then add phosphorus oxychloride (20 drops) dropwise with stirring. Gently warm on the steambath for ¾ hour then cool and let the reaction stand at room temperature for twenty hours. Add solid sodium methoxide (1.00 g.), stir and dilute with ether. Wash the extract with water, brine and dry then remove the solvent in vacuo. Triturate the residue with methanol and filter to get 3.50 g. of product. Treat the solid in methylene chloride with decolorizing charcoal, filter and replace the solvent with absolute ethanol by boiling. Cool and let stand to fully crystallize. Filter to obtain 2.4 g. of pure product, dl-3-cyclopentyloxy-13-ethyl - 17α - ethynyl - 17β-(tetrahydropyran-2-yloxy)gona-1,3,5(10)-triene, M.P. 155–158° C.

Analysis.—Calcd. for $C_{31}H_{42}O_3$ (percent): C, 80.47; H, 9.15. Found (percent): C, 80.24; H, 8.80.

EXAMPLE XX

To a solution of sodium methoxide (2.0 g.) in absolute ethanol (200 ml.) add dl-3-hydroxyestra-1,3,5(10),6,8,-pentaen-17-one (4.50 g.), stir then add cyclopentyl bromide (10 ml.). Reflux for two hours, cool and add more sodium methoxide (2.0 g.) then reflux for two hours and add more cyclopentyl bromide (10 ml.). Reflux a further two hours then cool and let stand overnight. Reflux two more hours then cool and remove the solvent in vacuo. Digest the residue with water and ethyl acetate, filter the mixture through filter-aid and wash the filter cake with ethyl acetate. Wash the organic layer with water, brine and dry. Remove the solvent in vacuo then dissolve the residue in methylene chloride, treat with decolorizing charcoal and filter. Replace the solvent with absolute ethanol by boiling, then let stand to fully crystallize. Filter to obtain 4.02 g. of the pure product, dl-3-cyclopentyl-oxyestra-1,3,5(10),6,8-pentaen-17-one, M.P. 162–164° C.;

$\lambda_{max.}^{KBr}$ 5.79μ; $\lambda_{max.}^{EtOH}$ 233 mμ (ε 50,600)

*Analysis.*—Calcd. for $C_{23}H_{26}O_2$ (percent): C, 82.59; H, 7.84. Found (percent): C, 82.39; H, 7.70.

In a similar manner, using the appropriate starting materials of Examples XVI and XVII, the following compounds are provided:

3-cyclopentyloxy-17α-ethylestra-1,3,5(10)-trien-17β-ol, acetate;

3-cyclopentyloxy-17α-propylestra-1,3,5(10)-trien-17β-ol, formate;

17α-chloroethynyl-3-cyclopentyloxyestra-1,3,5(10)-trien-17β-ol, acetate.

EXAMPLE XXI

Dissolve dl - 3-cyclopentyloxyestra-1,3,5,(10),6,8-pentaen-17-one (2.50 g.) in dry dimethylsulfoxide (100 ml.), bubble in purified acetylene gas for 45 minutes with stirring, then add lithium acetylide-ethylene diamine complex (1.5 g.). Stir under acetylene for two hours, then add another 2.0 g. of complex. Stir a further two hours, then pour onto ice. Extract the mixture with ether then wash, dry and evaporate the extract in vacuo. Dissolve the resulting oil in methanol, filter and reduce the methanol to low volume in vacuo. Scratch to induce crystallization then filter to obtain 1.71 g. of crude product, M.P. 165–167° C. Treat the solid in methylene chloride with decolorizing charcoal, filter and evaporate the solvent in vacuo. Crystallize the residue from methanol to get 1.33 g. of pure product, dl-3-cyclopentyloxy-17α-ethynylestra-1,3,5(10),6,8-pentaen-17β-ol, M.P. 167–169° C.;

$\lambda_{max.}^{KBr}$ 2.97 and 3.10μ; $\lambda_{max.}^{EtOH}$ 233 mμ (ε 53,600)

*Analysis.*—Calcd. for $C_{25}H_{28}O_2$ (percent): C, 83.29; H, 7.83. Found (percent): C, 83.52; H, 7.75.

EXAMPLE XXII

To a solution of sodium methoxide (2.0 g.) in absolute ethanol add dl-13-ethyl-3-hydroxygona-1,3,5(10),6,8,-pentaen-17-one (4.00 g.) then cyclopentyl bromide (12 ml.) and reflux for two hours. Add 2.0 g. more of sodium methoxide, reflux two hours then add cyclopentyl bromide (12 ml.) and reflux a further two hours. Let the reaction stand at room temperature overnight. Add another 2.0 g. of sodium methoxide and 12 ml. of cyclopentyl bromide, reflux two hours then cool and remove the solvent in vacuo. Dissolve the residue in methylene chloride, treat with decolorizing charcoal and filter. Replace the solvent with absolute ethanol by boiling and let stand to crystallize. Filter to obtain 3.48 g. of product, M.P. 150–152° C. Dissolve 0.48 g. of the solid in benzene, pass the solution through neutral anhydrous alumina then remove the benzene in vacuo. Crystallize the residue from methanol to get 0.19 g. of pure product, dl-3-cyclopentyloxy-13-ethylgona-1,3,5(10),6,8-pentaen-17-one, M.P. 157–159° C.;

$\lambda_{max.}^{KBr}$ 5.78μ; $\lambda_{max.}^{EtOH}$ 233 mμ (ε 53,500)

*Analysis.*—Calcd. for $C_{24}H_{28}O_2$ (percent): C, 82.72; H, 8.10. Found (percent): C, 82.53; H, 8.27.

EXAMPLE XXIII

Dissolve dl - 3 - cyclopentyloxy-13-ethylgona-1,3,5(10),6,8-pentaen-17-one (2.75 g.) in dry dimethylsulfoxide (100 ml.) then saturate with acetylene gas for 45 minutes. Add lithium acetylide-ethylene diamine complex (2.0 g.) and stir for one hour, then pour onto ice. Extract the mixture well with ether, wash, dry and evaporate the ether in vacuo. Dissolve the oil in benzene, pass through Florex then remove the benzene in vacuo. Triturate the resulting oil with cold methanol and filter to get 1.74 g. (in two crops) of crude product. Dissolve the solid in methylene chloride, treat with decolorizing charcoal, filter and remove the solvent in vacuo. Crystallize the resulting oil from hexane and filter to get 1.20 g. of pure compound, dl - 3 - cyclopentyloxy - 13 - ethyl - 17α-ethynylgona-1,3,5-(10),6,8-pentaen-17β-ol, M.P. 135–137° C.;

$\lambda_{max.}^{KBr}$ 2.93 and 3.07μ; $\lambda_{max.}^{EtOH}$ 233 mμ (ε 56,000)

*Analysis.*—Calcd. for $C_{26}H_{30}O_2$ (percent): C, 83.38; H, 8.07. Found (percent): C, 83.08; H, 8.13.

EXAMPLE XXIV

Dissolve dl-3hydroxyestra - 1,3,5(10),8 - tetraen-17-one (1.34 g.) in a solution of sodium methoxide (400 mg.) in absolute ethanol (10 ml.), stir, then add a solution of cyclopentyl bromide (1.34 g.) in absolute ethanol (15 ml.) and reflux the reaction for four hours, cool, then remove the ethanol in vacuo. Digest the residue with water, extract with ethyl acetate then wash the extract with water, brine and dry over anhydrous sodium sulfate. Filter, remove the solvent in vacuo and crystallize the residue from 95 percent ethanol to obtain 1.00 g. of the product, M.P. 122–125° C. Further purify the product by treating its methylene chloride solution with Nuchar charcoal, filtering through super cel and replacing the solvent with isopropanol by boiling. Let stand to obtain 0.86 g. of pure dl-3-cyclopentyloxyestra-1,3,5(10),8-tetraen-17-one, M.P. 124–126° C.;

$\lambda_{max.}^{KBr}$ 5.77μ: $\lambda_{max.}^{EtOH}$ 273 mμ (ε 16,900)

*Analysis.*—Calcd. for $C_{23}H_{28}O_2$ (percent): C, 82.10; H, 8.39. Found (percent): C, 81.93; H, 8.09.

In the like manner, dl - 13 - ethyl - 3 - hydroxygona-1,3,5(10),8-tetraen - 17 - one is converted to dl-3-cyclopentyloxy-13-ethylgona-1,3,5(10),8-tetraen-17-one.

EXAMPLE XXV

Dissolve dl-3 - cyclopentyloxy - 13 - ethylgona - 1,3,5 (10),8-tetraen-17-one (2.0 g.), as prepared in Example XXIV, in dry dimethyl sulfoxide (30 ml.) and bubble purified acetylene gas through the stirred solution for one hour. Then acid lithium acetylide-ethylene diamine (2.0 g.) and stir the mixture at room temperature under acetylene for two hours. Pour the reaction mixture into water, filter the resulting solid onto super cel. Extract the mixture of solids with methylene chloride, filter and concentrate. Dissolve the residue in a 1:1 hexane-benzene mixture and pass the solution through a column of Florex XXS and concentrate to afford dl-3-cyclopentyloxy-17α-ethynyl-13-ethylgona-1,3,5(10),8-tetraen-17β-ol.

EXAMPLE XXVI

Repeating the procedure of Example X to react an appropriate 13 - polycarbonalkyl-3-cyclopentyloxygon-17-one with lithium chloroacetylide, the following compound is prepared:

dl-17α-chloroethynyl-3-cyclopentyloxy-13-ethylgona-1,3,5(10),8-tetraen-17β-ol.

EXAMPLE XXVII

When the procedure of Example IX is repeated employing appropriate 13 - polycarbonalkyl-3-cyclopentyloxygon-17-ones, the following compound is obtained:

dl-3-cyclopentyloxy-13-propyl-17α-methylgona-1,3,5(10),8-tetraen-17β-ol.

EXAMPLE XXVIII d-3 - cyclopentyloxy - 13 - ethylgona - 1,3,5(10),8-tetraen-17-one (1.5 g.) is dissolved in dry dimethyl sulfoxide (60 ml.) and purified acetylene is bubbled through the stirred solution for one-half hour. Lithium acetylide-ethylene diamine (2.0 g.) is added and the reaction mixture is stirred for two hours. The reaction is then poured onto ice with stirring and extracted with ether. The latter is washed, dried and evaporated and the d-3-cyclopentyloxy-13-ethyl-17-ethynylgona - 1,3,5(10),8 - tetraen-17β-ol residue filtered through a column of fuller's earth using benzene. The solvent is removed and the product is recrystallized twice from methanol to provide $d$-3-cyclopentyloxy - 13 - ethyl - 17 - ethynylgona - 1,3,5(10),8-tetraen-17-ol, methanolate, 0.470 g., M.P. 116–117° C.;

$\lambda_{max.}^{KBr}$ 2.92, 3.10, 6.25, 8.02; $\lambda_{max.}^{EtOH}$ 278 m$\mu$ ($\epsilon$ 19,000), $[\alpha]_D^{24}$ −134° (c.=2, chf.)

In the same manner, $d$-3-cyclopentyloxy - 13 - methylgona-1,3,5(10),8-tetraen-17-one is reacted to afford $d$-3-cyclopentyloxy - 13 - methyl - 17 - ethynylgona - 1,3,5(10),8 - tetraen-17$\beta$-ol which is recrystallized from isopropanol to afford the corresponding $d$-3-cyclopentyloxy-13-methyl-17-ethynylgona - 1,3,5(10),8 - tetraen-17$\beta$-ol, isopropanolate, M.P. 124–125° C.

Analysis.—Calcd. for $C_{25}H_{30}O_2 \cdot 2C_3H_8O$ (percent): C, 77.13; H, 9.61. Found (percent): C, 77.36; H, 9.30.

EXAMPLE XXIX

Dissolve $d$-3-cyclopentyloxy - 13 - ethylgona - 1,3,5(10),8-tetraen-17-one (1.5 g.) in methanol (160 ml.) containing concentrated hydrochloric acid (6 ml.), boil for one-half hour, reduce to one-half volume and filter to isolate the product, $d$-3-cyclopentyloxy - 13-ethylgona-1,3,5(10),9(11)-tetraen-17 - one, as needles (1.275 g.), M.P. 155–157° C.;

$\lambda_{max.}^{EtOH}$ 269 m$\mu$ ($\epsilon$ 15,422), $[\alpha]_D^{24}$=+47° (c.=.6, chf.)

In a similar manner, using the appropriate starting materials, the following compounds are provided:

3-cyclopentyloxy-13-ethylgona-1,3,5(10),9(11)-tetraen-17-ol;
17$\alpha$-chloroethynyl-3-cyclopentyloxy-13-ethylgona-1,3,5(10),9(11)-tetraen-17$\beta$-ol;
3-cyclopentyloxy-13,17$\alpha$-diethylgona-1,3,5(10),9(11)-tetraen-17$\beta$-ol;
3-cyclopentyloxy-13-ethyl-17$\alpha$-methylgona-1,3,5(10),9(11)-tetraen-17$\beta$-ol.

EXAMPLE XXX

Dissolve $d$ - 3-cyclopentyloxy-13-ethylgona-1,3,5(10),9(11)-tetraen-17-one (1.10 g.) in dry dimethylsulfoxide (50 ml.) saturated with acetylene, add lithium acetylide-ethylene diamine complex (2.0 g.) and stir for three hours. Pour on ice, extract with ether, wash, dry and evaporate and recrystallize the residue from isopropanol to provide the product (0.525 g.) $d$-3-cyclopentyloxy-13-ethyl - 17 - ethynylgona - 1,3,5(10),9(11) - tetraen - 17$\beta$-ol, hemi-isopropanolate, M.P. 108–109° C.;

$\lambda_{max.}^{KBr}$ 3.02, 3.10, 6.23, 8.03$\mu$; $\lambda_{max.}^{EtOH}$ 272 m$\mu$ ($\epsilon$ 15,630), $[\alpha]_D^{25}$= −99° (c.=2, chf.)

Analysis.—Calcd. for $C_{26}H_{32}O_2 \cdot \frac{1}{2}$ isopropanol (percent): C, 81.23; H, 8.92. Found (percent): C, 80.66; H, 8.45.

EXAMPLE XXXI

Reflux $dl$ - 13 - ethyl - 3 - hydroxygona - 1,3,5(10),9(11)-tetraen-17-one with sodium methoxide and cyclopentyl bromide in ethanol for four hours. Isolate the product, $dl$ - 3 - cyclopentyloxy - 13 - ethylgona - 1,3,5(10),9(11)-tetraen-17-one, M.P. 127–178° C.

$\lambda_{max.}^{EtOH}$ 269 m$\mu$ ($\epsilon$ 17,000)

EXAMPLE XXXII

Dissolve $dl$ - 3 - cyclopentyloxy - 13 - ethylgona - 1,3,5(10),9(11)-tetraen-17-one (0.800 g.) in dry dimethylsulfoxide saturated with acetylene, add lithium acetylide-ethylene diamine complex (1.0 g.) and stir for two hours. Add a second 1.0 g. of complex, stir two hours, pour onto ice, extract with ether and wash, dry and evaporate the ether. Filter the residue through Florex in benzene, evaporate and crystallize using isopropanol-petroleum ether to provide the product (0.195 g.), $dl$-3-cyclopentyloxy - 13 - ethyl - 17 - ethynylgona - 1,3,5(10),9(11) - tetraen - 17$\beta$ - ol, hemi-isopropanolate, M.P. 53–56° C.;

$\lambda_{max.}^{KBr}$ 3.0, 3.07, 6.21, 8.0$\mu$

Analysis.—Calcd. for $C_{26}H_{32}O_2 \cdot \frac{1}{2}$ isopropanol (percent): C, 81.23; H, 8.92. Found (percent): C, 81.38; H, 8.65.

What is claimed is:

1. A compound selected from the group consisting of those having the formula:

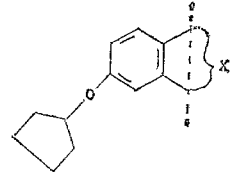

wherein X is a moiety selected from the group consisting of

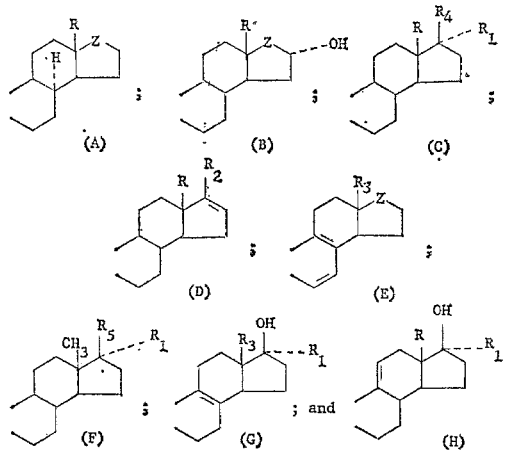

wherein R is polycarbonalkyl; Z is selected from the group consisting of $\beta$-hydroxymethylene, carbonyl, $\alpha$-ethynyl-$\beta$-hydroxymethyl, $\alpha$-chloroethynyl-$\beta$-hydroxymethylene, and $\alpha$-(lower)-alkyl-$\beta$-hydroxymethylene; $R_1$ is selected from the group consisting of lower alkyl, chloroethynyl and ethynyl; $R_2$ is lower alkanoyloxy; $R_3$ is lower alkyl; $R_4$ is selected from the group consisting of hydroxy, lower alkanoyloxy and tetrahydropyran-2-yloxy; and $R_5$ is selected from the group consisting of lower alkanoyloxy and tetrahydropyran-2-yloxy.

2. A compound as described in claim 1 selected from the group consisting of those having the formula:

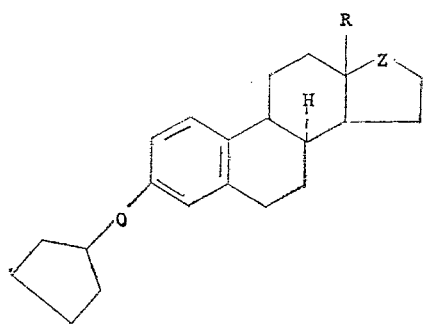

wherein Z is selected from the group consisting of $\beta$-hydroxymethylene, carbonyl, $\alpha$-ethynyl-$\beta$-hydroxymethylene, $\alpha$-chloroethynyl-$\beta$-hydroxymethylene and $\alpha$-(lower)alkyl-$\beta$-hydroxymethylene and R is polycarbonalkyl.

3. A compound as described in claim 2 which is: 3-cyclopentyloxy-13-ethyl-8$\alpha$-gona-1,3,5(10)-trien-17-one.

4. A compound as described in claim 2 which is: 3-cyclopentyloxy-13-ethyl-8α-gona-1,3,5(10)-trien-17β-ol.

5. A compound as described in claim 2 which is: 3-cyclopentyloxy-13-ethyl-17α-ethynyl-8α-gona - 1,3,5(10)-trien-17β-ol.

6. A compound as described in claim 1 selected from the group consisting of those having the formula:

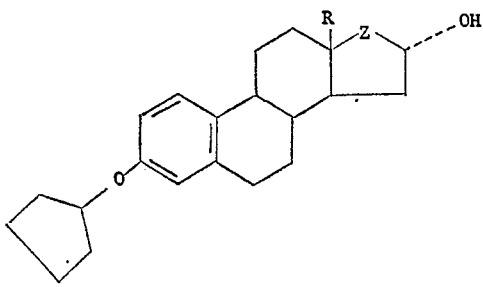

wherein Z is selected from the group consisting of β-hydroxymethylene, carbonyl, α-ethynyl-β-hydroxymethylene, α-chloroethynyl-β-hydroxymethylene and α-(lower)alkyl-β-hydroxymethylene; and R is polycarbonalkyl.

7. A compound as described in claim 6 which is: 3-cyclopentyloxy-13-ethylgona-1,3,5(10) - trien - 16α,17β-diol.

8. A compound as described in claim 6 which is: 3-cyclopentyloxy-13-ethyl-16α - hydroxygona - 1,3,5(10)-trien-17-one.

9. A compound as described in claim 6 which is: 3-cyclopentyloxy - 13 - ethyl-17α-ethylnylgona-1,3,5(10)-trien-16α,17β-diol.

10. A compound as described in claim 1 selected from the group consisting of those having the formula:

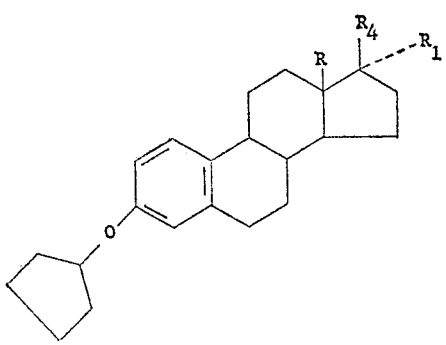

wherein $R_1$ is selected from the group consisting of lower alkyl, chloroethynyl and ethynyl; R is polycarbonalkyl; and $R_4$ is selected from the group consisting of hydroxy, lower alkanoyloxy and tetrahydropyran-2-yloxy.

11. A compound as described in claim 10 which is: 3-cyclopentyloxy - 13 - ethyl - 17α - ethynylgona-1,3,5(10)-trien-17β-ol.

12. A compound as described in claim 10 which is: 17α-chloroethynyl - 3 - cyclopentyloxy - 13 - ethylgona-1,3,5(10)-trien-17β-ol.

13. A compound as described in claim 10 which is: d-3-cyclopentyloxy - 13 - ethyl - 17α - ethynylgona-1,3,5(10)-trien-17β-ol, acetate.

14. A compound as described in claim 10 which is: 3-cyclopentyloxy - 13 - ethyl - 17α - ethynylgona-1,3,5(10)-trien-17β-ol, acetate.

15. A compound as described in claim 10 which is: 3-cyclopentyloxy - 13 - ethyl - 17α - ethynyl-17β-(tetrahydropyran-2-yloxy)gona-1,3,5(10)-triene.

16. A compound as described in claim 1 selected from the group consisting of those having the formula:

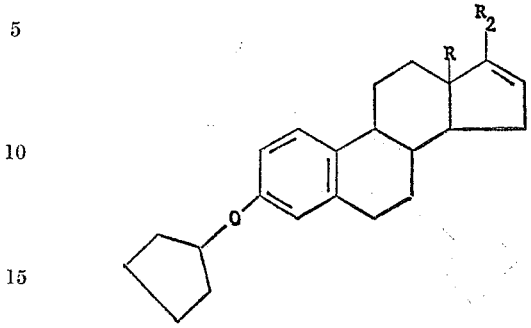

wherein R is polycarbonalkyl; and $R_2$ is lower alkanoyloxy.

17. A compound as described in claim 16 which is: 3-cyclopentyloxy - 13 - ethylgona - 1,3,5(10),16-tetraen-17-ol, acetate.

18. A compound as described in claim 1 selected from the group consisting of those having the formula:

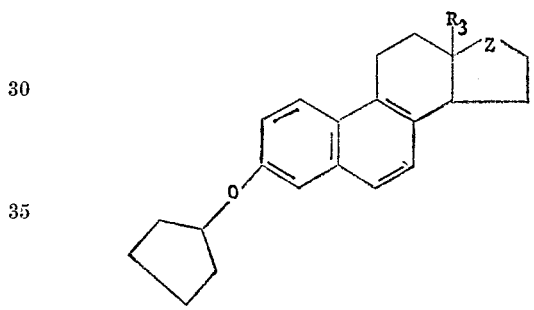

wherein Z is selected from the group consisting of β-hydroxymethylene, carbonyl, α-ethynyl-β-hydroxymethylene, α-chloroethynyl-β-hydroxymethylene, and α-(lower)alkyl-β-hydroxymethylene; and $R_3$ is lower alkyl.

19. A compound as described in claim 18 which is: 3-cyclopentyloxy - 13 - ethylgona-1,3,5(10),6,8-pentaen-17-one.

20. A compound as described in claim 18 which is: 3-cyclopentyloxy - 13 - ethyl-17α-ethynylgona-1,3,5(10),6,8-pentaen-17β-ol.

21. A compound as described in claim 1 selected from the group consisting of those having the formula:

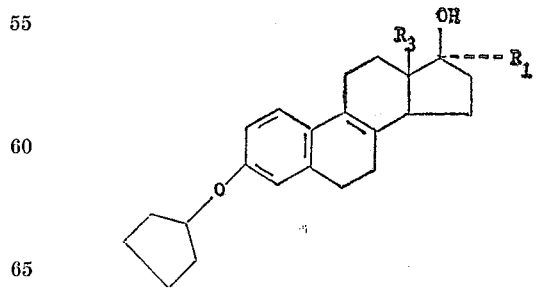

wherein $R_1$ is selected from the group consisting of lower alkyl, chloroethynyl and ethynyl; and $R_3$ is lower alkyl.

22. A compound as described in claim 21 which is: d-3-cyclopentyloxy - 13 - ethyl - 17α - ethynylgona-1,3,5(10),8-tetraen-17β-ol.

23. A compound as described in claim 21 which is: d-3-cyclopentyloxy - 13 - ethyl - 17α - ethynylgona-1,3,5(10),8-tetraen-17β-ol-methanolate.

24. A compound as described in claim 1 selected from the group consisting of those having the formula:

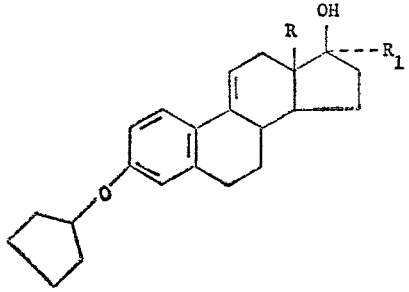

wherein R is polycarbonalkyl and $R_1$ is selected from the group consisting of lower alkyl, chloroethynyl and ethynyl.

25. A compound as described in claim 24 which is: d-3-cyclopentyloxy - 13 - ethyl - 17α - ethynylgona-1,3,5(10), 9(11)-tetraen-17β-ol.

26. A compound as described in claim 24 which is: 3-cyclopentyloxy - 13 - ethyl - 17α - ethynylgona-1,3,5(10), 9(11)-tetraen-17β-ol, hemi-isopropanolate.

27. A compound as described in claim 24 which is: 3-cyclopentyloxy - 13 - ethyl - 17α - ethynylgona-1,3,5(10), 9(11)-tetraen-17β-ol.

References Cited
UNITED STATES PATENTS

| | | | |
|---|---|---|---|
| 3,189,605 | 6/1965 | Smith et al. | 260—239.55 |
| 3,272,849 | 9/1966 | Wendt et al. | 260—397.5 |
| 3,290,297 | 12/1966 | Cross | 260—239.55 |
| 3,326,945 | 6/1967 | Chamberlin | 260—397.4 |
| 3,365,473 | 1/1968 | Taub | 260—397.3 |

OTHER REFERENCES

Greenblatt, Fertility and Sterility, 18, 207 (1967).

HENRY A. FRENCH, Primary Examiner

U.S. Cl. X.R.

260—397.4, 397.45, 397.5, 999